(No Model.)

W. T. WILSON.
SAW.

No. 398,302. Patented Feb. 19, 1889.

Witnesses
Harry L. Cohur.
Duane E. Fox.

Inventor
William T. Wilson
by Schuyler Durgee
Attorney

UNITED STATES PATENT OFFICE.

WILLIAM T. WILSON, OF MARSHFIELD, OREGON.

SAW.

SPECIFICATION forming part of Letters Patent No. 398,302, dated February 19, 1889.

Application filed August 23, 1888. Serial No. 283,539. (No model.)

*To all whom it may concern:*

Be it known that I, WILLIAM T. WILSON, a resident of Marshfield, in the county of Coos and State of Oregon, have invented certain new and useful Improvements in Saws; and I do hereby declare the following to be a full, clear, and exact description of the invention, such as will enable others skilled in the art to which it pertains to make and use the same.

This invention relates to the construction of saws for sawing large or small timber; and it consists in certain improvements in the construction and arrangement of the saw-teeth, as hereinafter set forth and claimed.

Figure 1:
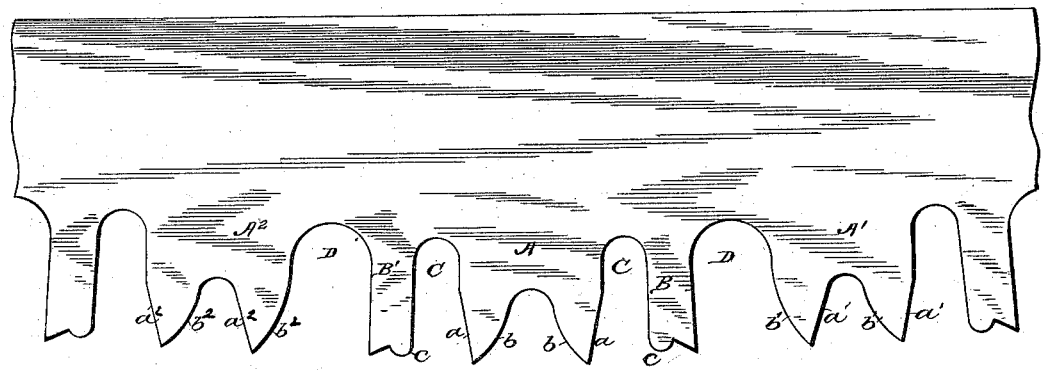
Figure 2:
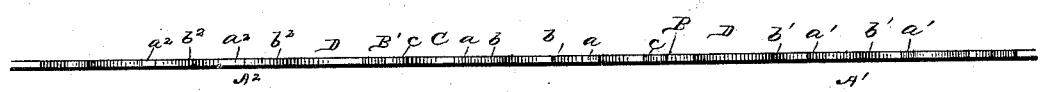

In the accompanying drawings, Figure 1 is a side view of a saw provided with my improvement, and Fig. 2 is an edge view of the same.

At the center or about midway of the cutting-edge the saw is provided with the tooth A, which is divided at the center and has two cutting-faces, $a$, facing in opposite directions from the center, the inner edges, $b$, formed by the central division of the tooth being rounded, as shown.

Next to the central tooth, A, the space C intervening, are formed two rakes or clearing-teeth, B and B'—one being in each direction from A, and each facing from the center and having its rear edge rounded at $c$. The other double cutting-teeth, A' A², are arranged in opposite directions from A, with clearing-teeth between them, as shown. The double teeth A' and A² differ in construction from the central tooth, A, in having both of the cutting-faces of each tooth in the same direction—that is, the cutting-faces $a'$ of each tooth A' and A² are outward from tooth A, the faces of one set being toward one extremity of the saw and the faces $a^2$ of the other set being toward the opposite extremity. The clearers B B' are in like manner faced outwardly in opposite directions, respectively. Wide spaces D are provided between the front faces of the clearing-teeth and the double cutting-teeth for the accumulating sawdust, which is removed by the clearers, the spaces C, at the rear of the clearers, being narrower, as little or no dust accumulates on the return or backward movement of the saw. The saw thus formed with the two sets of teeth and clearers facing, respectively, in opposite directions from the central tooth in operation will cut in both directions from the center, and the cutting is rapidly effected, the clearers in like manner working in opposite directions from the center and keeping the cut clear of dust.

The double cutting-teeth, being rounded at their rear edges, are found to be in the best form for strength and for durability at the points. Saws of this construction may be made of different sizes, and in saws of certain lengths a clearing-tooth may occupy the central point instead of tooth A, in which case such tooth should be formed with two working-faces, so as to act in either direction.

I claim—

In a saw, a central double tooth, A, having opposite cutting-edges $a$, in combination with a series of double teeth, A', having cutting-edges $a'$ and rounded edges $b'$, and intervening clearing-teeth B, occupying one part of the saw, and another series of double teeth, A², having cutting-edges $a^2$ and rounded edges $b^2$, and intervening clearing-teeth B', occupying another part of the saw, the teeth of the two series being constructed, respectively, to cut from the center in opposite directions, substantially as set forth and described.

In testimony whereof I have signed this specification in the presence of two subscribing witnesses.

WILLIAM T. WILSON.

Witnesses:
J. A. GRAY,
C. L. LANDRITH.